Dec. 1, 1925.　　　　　　　　　　　　　　　　　　　　1,563,608
J. N. WOOD
AIR AND FUEL HEATER FOR INTERNAL COMBUSTION ENGINES
Filed Sept. 12, 1921
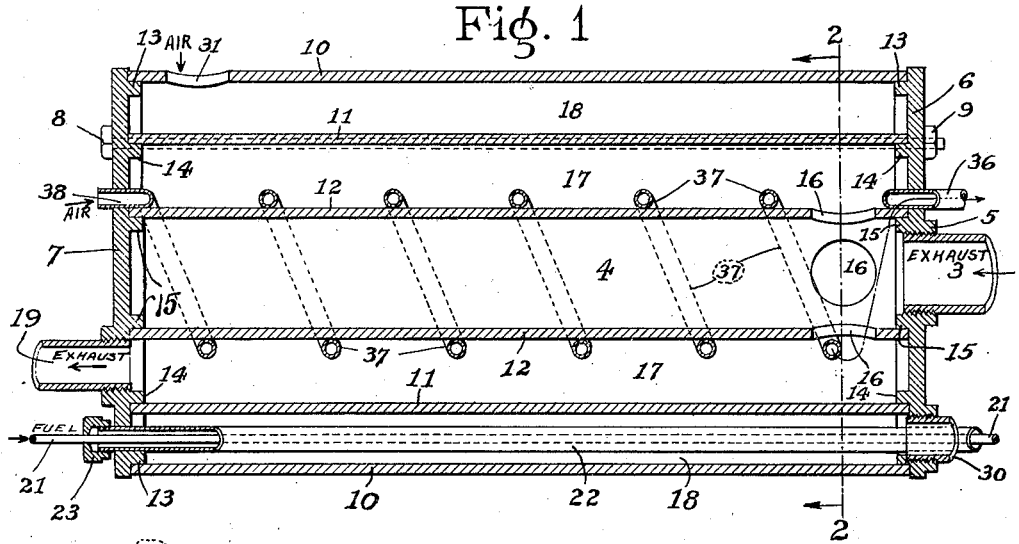
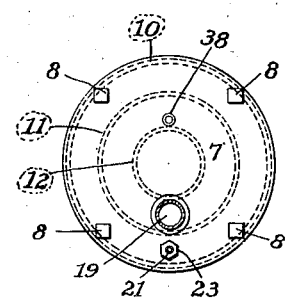 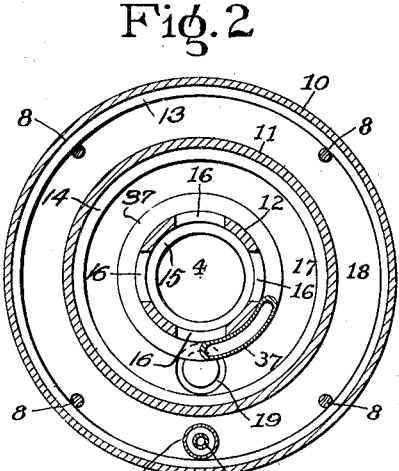 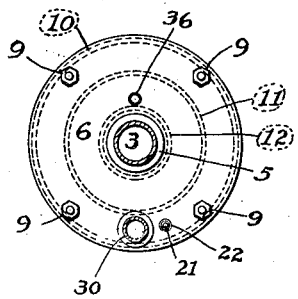
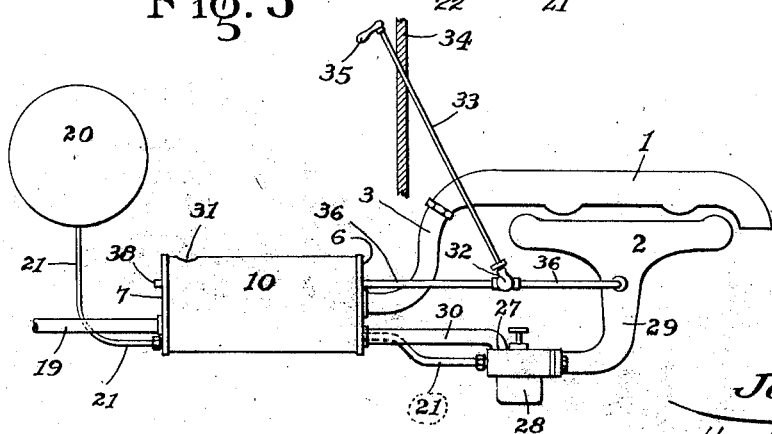
INVENTOR
Jesse N. Wood,
BY Hugh H. Wagner
ATTORNEY Patented Dec. 1, 1925.

1,563,608

UNITED STATES PATENT OFFICE.

JESSE N. WOOD, OF VENICE, ILLINOIS.

AIR AND FUEL HEATER FOR INTERNAL-COMBUSTION ENGINES.

Application filed September 12, 1921. Serial No. 500,172.

*To all whom it may concern:*

Be it known that I, JESSE N. WOOD, a citizen of the United States, residing at the town of Venice, in the county of Madison and State of Illinois, have invented certain new and useful Improvements in Air and Fuel Heaters for Internal-Combustion Engines, of which the following is a specification.

This invention is a heater for the air and fuel used in all kinds of internal combustion engines, whether such fuel be a distillate, or gasoline, or oil, or any other. The result of its use is great economy in fuel, as evidenced by increased mileage per unit of fuel. One of its advantages is that it equalizes motor conditions of winter and summer.

In the accompanying drawings forming part of this specification, in which like numbers of reference denote like parts wherever they occur—

Figure 1 is a longitudinal sectional view of the heater;

Figure 2 is a sectional view on the line 2—2 in Figure 1;

Figure 3 is a rear-end elevation;

Figure 4 is a front-end elevation; and

Figure 5 is a diagrammatic side elevation of the device as applied to an internal combustion engine.

The exhaust manifold 1 leads from the engine, and the exhaust pipe 3 conducts the exhaust into the center chamber 4 of this device, pipe 3 being threaded into the collar 5 forming part of plate 6, which constitutes the forward end of this device.

Plate 7 constitutes the rear end of this device, the said two plates, 6 and 7, being bolted together by a plurality of long bolts 8 and nuts 9.

Three concentric pipes or drums 10, 11, and 12 are arranged between plates 6 and 7. Each is telescoped at its ends upon collars or annular flanges formed integrally with or attached to plates 6 and 7, pipe 10 telescoping on flanges 13, pipe 11 on flanges 14, and pipe 12 telescoping upon flanges 15.

A plurality of holes 16 (preferably four in number) permit the exit of the hot products of combustion from chamber 4 into chamber 17, formed in the space between pipe 11 and pipe 12. The rear end of chamber 4 is closed by plate 7 as is also the rear end of chamber 17 and chamber 18. The forward end of these chambers is closed by plate 6, except, of course, that the entrance of exhaust pipe 3 into the front end of chamber 4 to a large extent takes the place of such closure.

For purposes hereinafter mentioned the exhaust within chamber 4 is useful in heating pipe 12, and when the products of combustion have passed through openings 16 into chamber 17 they heat, also, pipe 11 and thereby chamber 18 and escape through exit opening 19.

The fuel is contained in tank 20 and is thence conducted by pipe 21 through chamber 18, where it is enclosed within pipe 22, entering the same through collar 23. Collar 23 is threaded upon one end of pipe 22.

In chamber 18 the fuel coming from tank 20 is heated, and after leaving the same, pipe 21 continues on to carburetor 28 into which the heated air enters at 27 and from the carburetor 28 the mixture of air and fuel enters the intake manifold 29.

The air that enters carburetor 28 at 27 comes through pipe 30 that leads from chamber 18, in which the air that enters the main air inlet 31 is heated.

The heat of the products of combustion first admitted in the chamber 4, thence passing into chamber 17, and thus heating chamber 18 and its contents, causes both the pipe 22 and the air to attain the same temperature in chamber 18.

In winter or in the presence of extreme cold arising from any cause, the air received through inlet 31 may not be adequately heated, and in such event additional and hotter air may be admitted to the intake manifold by operating a valve 32 by the rod 33, mounted in the dashboard 34, by means of the handle 35, whereupon the engine immediately begins to draw the hotter air through pipe 36, which connects with the end of copper coil 37, spirally wound around pipe 12 and leading from the auxiliary air inlet 38. By this means the mixture fed into the intake manifold will be maintained at a temperature substantially the same in winter as in summer.

Pipe 37 is heated by the exhaust gas in chamber 17 and by contact with the hot pipe 12, which is heated by the products of combustion in chamber 4.

Pipe 21 is inclosed within pipe 22 in order that the gasoline or other fuel passing therethrough will not be vaporized at that point.

Having thus described this invention, I hereby reserve the benefit of all changes in form, arrangement, order, or use of parts, as it is evident that many minor changes may be made therein without departing from the spirit of this invention or the scope of the following claims.

I claim:

1. A heater for the air and for the fuel supplied to an internal combustion engine, comprising a plurality of concentric tubes connected together at their ends by front and rear heads, the central tube having openings at the forward end to form communication with the chamber surrounding said central tube, an exhaust pipe from an internal combustion chamber communicating with the central tube adjacent the openings therein, the rear head having an exhaust pipe which communicates with the chamber adjacent and surrounding the central tube, an insulated liquid fuel supply pipe extending through the front and rear heads and the outermost chamber surrounding the middle chamber containing the exhaust gases from the exhaust pipe, and a hot air outlet pipe communicating with the said outermost chamber, the outer tube having an air inlet opening near the rear and top portion for admitting air to be heated therein.

2. A heater for the air and for the fuel supplied to an internal combustion engine, comprising a plurality of concentric tubes connected together at their ends by front and rear heads, the central tube having openings at the forward end to form communication with the chamber surrounding said central tube, an air inlet pipe communicating with the atmosphere and extending through the rear head and coiled around the central tube and extending through the front head to heat auxiliary air supplied to the intake manifold, an exhaust pipe from an internal combustion engine communicating with the central tube adjacent the openings therein, the rear head having an exhaust pipe which communicates with the chamber surrounding the central tube, a heat insulating pipe extending through the front and rear heads and the outermost chamber, a cap for closing the rear end of the heat insulating pipe, a liquid fuel supply pipe extending through the cap and the heat insulating pipe to supply heated fuel to a carburetor, and a hot air outlet pipe communicating with the outermost chamber, the outer tube having an air inlet opening near the rear and top portion for admitting air to be heated therein.

In testimony whereof I hereunto affix my signature.

JESSE N. WOOD.